United States Patent
Salzman et al.

(10) Patent No.: US 7,097,696 B2
(45) Date of Patent: Aug. 29, 2006

(54) DUAL CARTRIDGE AIR DRYER WITH OIL SEPARATOR AND READILY CHANGEABLE VALVES

(75) Inventors: Monte Salzman, Lake in the Hills, IL (US); Tom Mahoney, Elmwood Park, IL (US)

(73) Assignee: SKF USA Inc., Elgin, IL (US)

( * ) Notice: Subject to any disclaimer, the term of this patent is extended or adjusted under 35 U.S.C. 154(b) by 224 days.

(21) Appl. No.: 10/788,872

(22) Filed: Feb. 27, 2004

(65) Prior Publication Data

US 2005/0188848 A1 Sep. 1, 2005

(51) Int. Cl.
B01D 53/04 (2006.01)
F26B 21/00 (2006.01)

(52) U.S. Cl. ............... 96/121; 96/134; 96/139; 55/527; 55/DIG. 17

(58) Field of Classification Search .......... 96/134, 96/135, 121, 130, 139, 141; 34/80; 55/315, 55/527, DIG. 17
See application file for complete search history.

(56) References Cited

U.S. PATENT DOCUMENTS

| | | |
|---|---|---|
| 3,891,417 A | 6/1975 | Wade |
| 4,108,617 A | 8/1978 | Frantz |
| 4,468,239 A | 8/1984 | Frantz |
| 4,692,175 A | 9/1987 | Frantz |
| 5,209,764 A | 5/1993 | Eberling |
| 5,378,266 A | 1/1995 | Elamin |
| 5,660,607 A | 8/1997 | Jokschas et al. |
| 5,961,698 A | 10/1999 | Dossaji et al. |
| 5,983,516 A | 11/1999 | Trapp et al. |
| 6,014,820 A | 1/2000 | Jones et al. |
| 6,094,836 A * | 8/2000 | Mahoney et al. ............. 34/80 |
| 6,280,492 B1 | 8/2001 | Binder et al. |
| 6,484,413 B1 | 11/2002 | Larsson |
| 6,581,297 B1 | 6/2003 | Ginder |

* cited by examiner

Primary Examiner—Frank M. Lawrence
(74) Attorney, Agent, or Firm—Vedder Price Kaufman & Kammholz

(57) ABSTRACT

An air dryer system including two substantially identical canister-type air dryer units. Each includes a moist air inlet, a first desiccant, a dry air outlet, and means for supplying dry air to a storage facility. The system also includes a bleed valve supplying a small portion of the dry air to regenerate a second desiccant, and a first moist air purge valve. The system operates in the opposite mode and supplies air to a storage facility. Located between the moist air inlets and the desiccants are a pair of air-oil separators. In these, upwardly directed air flows through a housing, striking a deflector plate, and escapes beneath a vertically extending fence and through vents containing a filter medium.

19 Claims, 7 Drawing Sheets

DUAL CARTRIDGE AIR DRYER WITH OIL SEPARATOR AND READILY CHANGEABLE VALVES

BACKGROUND OF THE INVENTION

The present invention relates generally to air dryer assemblies, and more particularly to a twin tower type desiccator having two spin-on dryer cartridges each containing a volume of desiccant within a bag, and which includes a novel air-oil separator and valves which may be readily changed.

The unit has particular application in buses and railroad cars, as well as other applications wherein the duty cycle of the air compressor may be continuous. Another feature of the invention is ease of maintenance, so that little if any downtime is required. This is achieved by having spin-on cartridges, accessible valves and an oil separator which may be removed and replaced easily.

The unit operates, basically, by drying incoming compressed air in one cartridge while simultaneously regenerating the opposite cartridge with a portion of previously dried air. Control over the cycles is achieved with a so-called MLT (micro-logic timer) and associated valve which controls the cycling of the apparatus.

The reason for having dry air is that the air brake systems do not tolerate liquid water, nor even air which is relatively high in water vapor content. Consequently, it is highly desirable to use air that has been virtually completely dried. The problem of moisture in compressed air systems is well-known. It is known, for example that the reason that compressed air contains a great deal of moisture is that the process of compressing the air concentrates the same amount of moisture in a much smaller volume, thus raising the relative humidity of the compressed air.

Consequently, with air operating at a high degree of compression, there is a substantial increase in the relative humidity. If air, for example, is compressed at or above 200 psi, the relative amount of moisture therein can become very great. Accordingly, it is necessary when operating brakes or the like which have a requirement for dry air, to use some means of drying incoming or ambient air until its relative humidity is close to zero.

In addition to being dry, the air used in air brakes, for example, should be finely filtered to remove as many solid contaminants as possible, for obvious reasons, and should also contain means to separate oil from the air. Such an oil-air separator is a valuable feature of the present invention.

Accordingly, it is an object of the invention to provide an improved air dryer.

Another object is to provide such a unit with an air-oil separator of a novel design.

A still further object is to provide an air-oil separator which is disposed in unit so as to induce turbulent flow in incoming air, and to have the air undergo a direction-reversal before passing through a screen and filter on its way to the desiccant canisters.

Another object is to provide a pair of valves having small orifices therein through which air may flow even when these valves are closed, such air being used to pass in a reverse direction to strip moisture from, and thus regenerate, the desiccant cartridge.

Another object of the invention is to provide an air dryer having dual towers, each of which contains a desiccant in a cartridge of the spin-on variety of facilitate changing the desiccant when necessary.

Yet another object of the invention is to provide a cartridge which provides a filter for particulate materials and a tortuous path for the air which is to be directed to and through the desiccator.

Still another object of the invention is to provide an air dryer wherein the desiccant is contained in bags which are in turn contained in a cylindrical housing, which means the desiccant may be very finely subdivided for maximum effectiveness, and yet not be subject to leaking from its container.

A further object of the invention is to provide an air dryer containing twin towers in which, when one tower of the dryer is serving to dry incoming air, the other tower uses a minor portion of that air to regenerate the desiccant contained in the second tower.

Still another object of the invention is to provide a simplified, spin-on system of cartridge removal and replacement, which may be used only every year or two.

A further object of the invention is to provide a system wherein all essential elements of the air dryers are positioned so as to be readily available for maintenance, replacement, and/or repair.

A still further object of the invention is to provide a dual cartridge dryer which achieves economy and which is adaptable to specialty equipment and a large variety of other applications.

A further object of the invention is to provide an air-oil separator having a filter medium which is surface active and which therefore adsorbs oil and moisture, and which therefore can be regenerated by drier air passing over the separator in a reverse direction.

Yet another object of the invention is to provide a separator containing an aramid or equivalent adsorbing filter adhesively attached to a portion of the separator structure.

These and other objects and advantages of the present invention are achieved in practice by providing a dual cartridge desiccator system wherein air is subjected to oil separation by a novel device used in conjunction with a well or like housing for reversing the direction of air flow, adsorbing the oil in the air stream, passing the air through a filter and through the exterior of a desiccant cartridge, and thereafter passing it down and through the desiccant cartridge, and having it exit by way of a valve to an outlet port. The other cartridge is simultaneously regenerated by a controlled amount of bleed air entering the cartridge and flowing backwards through the desiccant contained in that cartridge and ultimately out a drain port controlled by a valve opened by air pressure. This operates the cycle in an opposite direction, all without causing an interruption or a loss of air pressure to the main supply.

The invention also achieves its objects by providing an electrically operated timer in the same device including a novel oil separator, whereby air pressure is directed to a control for an exhaust or purge valve for wet air and also to the inlet valve for air to be dried, while also providing certain auxiliary functions.

The manner in which the invention achieves its objects and other objects which are inherent in the invention will become more clearly apparent when reference is made to the following description of the preferred embodiments of the invention set forth by way of example and shown in the accompanying drawings in which like reference numbers indicate corresponding parts throughout.

DESCRIPTION OF THE PREFERRED EMBODIMENTS OF THE INVENTION

The invention has several aspects and may be practiced in a number of different ways or with different variations. However, a description will be made of a presently preferred embodiment of the invention.

Figure 1:
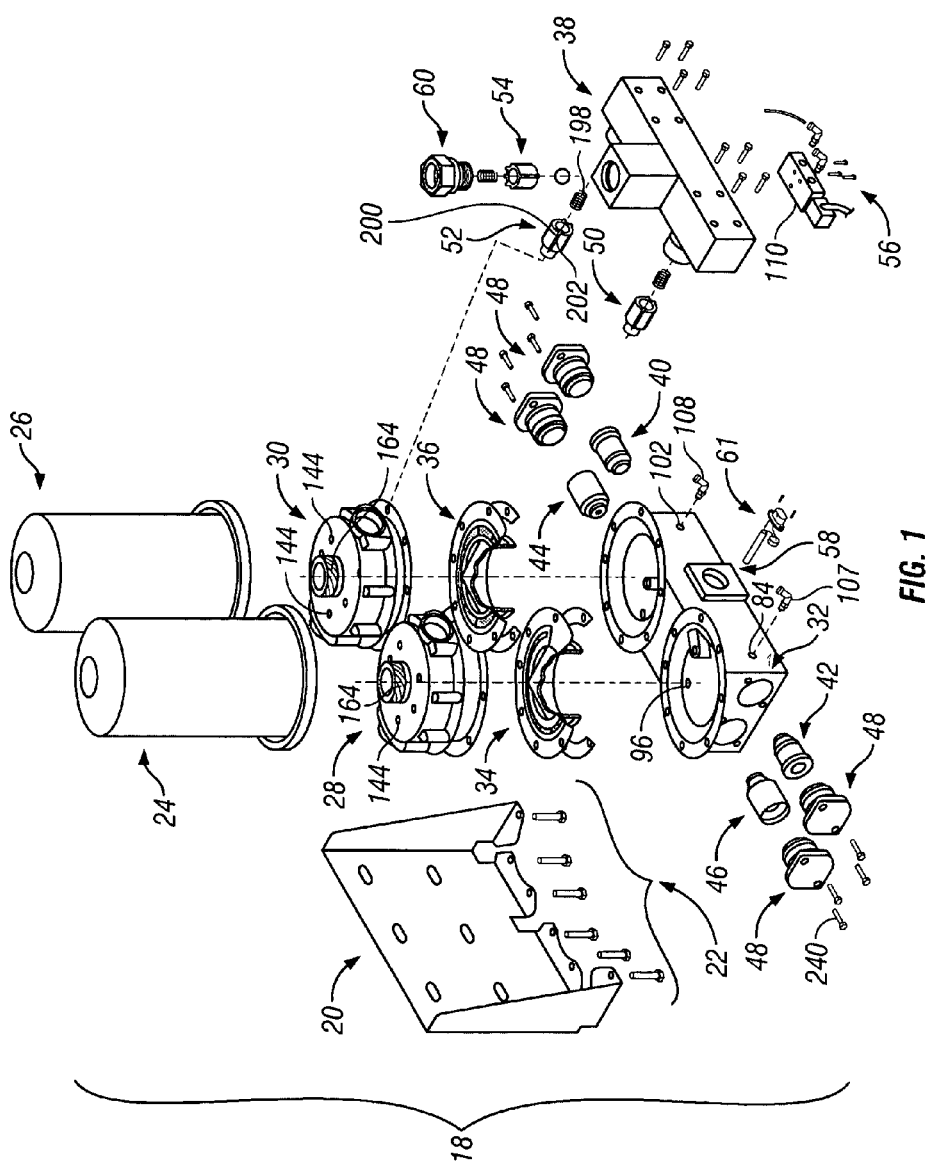
FIG. 1 is an exploded perspective view showing the principal components of the invention.

Referring now to the drawings in greater detail, FIG. 1 shows the air dryer unit generally designated 18 to include a mounting bracket generally designated 20, plural fasteners generally designated 22, and a pair of desiccant canisters generally designated 24, 26.

In addition, FIG. 1 shows a pair of annular canister mounts generally designated 28, 30, a lower valve body generally designated 32, a pair of air-oil separators generally designated 34, 36, a manifold generally designated 38 for directing a major portion of air from one cartridge to a tank or other storage facility (not shown) and for directing a minor portion of air to the other cartridge.

The lower valve body generally designated 32 includes a pair of inlet check valves 40, 42 and a pair of purge air valves generally designated 44, 46. Each of these is held in place by a series of covers generally designated 48. There are regeneration/drying valves generally designated 50, 52, and a spring loaded one-way check valve generally designated 54 through which air passes to the fitting 60 and then to the storage tank or equivalent (not shown). FIG. 1 also shows an MLT (micro-logic timer) valve generally designated 56, and an inlet port generally designated 58 for air from the air compressor, which air is to be dried and ultimately sent to the storage tank, but only after passing through the various passages, valves, and the novel air-oil separator of the invention. A heater element generally designated 61 is also shown.

Figure 2:
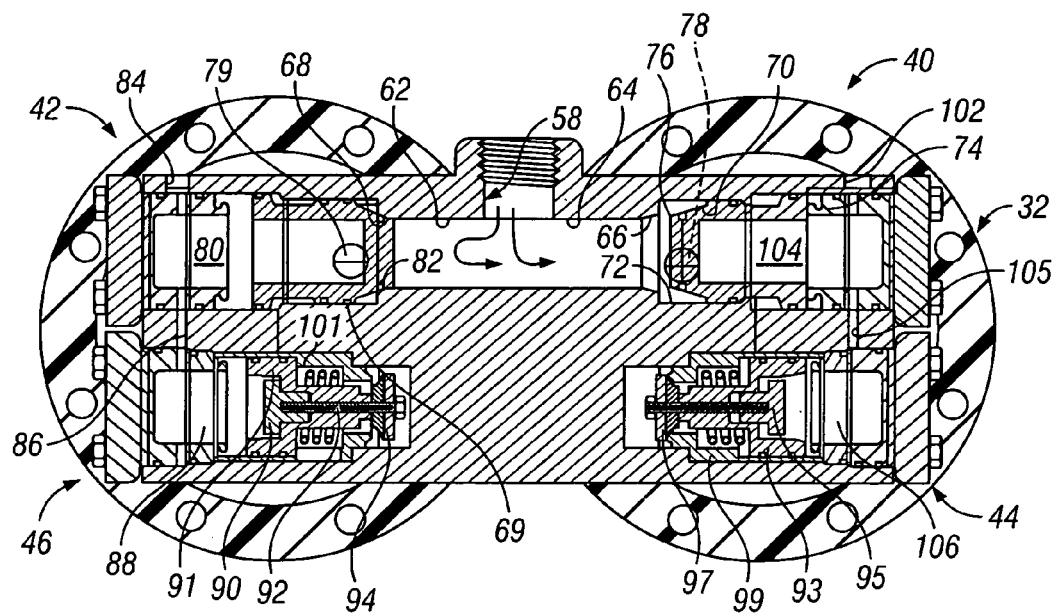
FIG. 2 is a horizontal sectional view of the lower valve body showing the check valves and the purge valves of the invention.

Referring now to FIG. 2, there is shown a detailed view of the lower valve body 32. This body 32 contains a pair of check valves 40, 42 and a pair of purge air valves generally designated 44, 46. These drawings show that the principal inlet passage 58 is divided into two passages, 62, 64, that lead respectively to two separate valve seats 66, 68. The MLT valve 56, a detailed explanation of which appears in U.S. Pat. No. 6,094,836, controls air flowing into the port 58, and determines which passage, 62 or 64, will have air flowing therein. The nose portion 70 of the inlet check valve 40 rests on the seat 66 in one position, thus closing the valve 40, on the one hand, and the inlet check valve slides backwardly in the bore 72, thus opening the passage 64 on the other hand. In the open position, the rear end portion 70 of the valve 40 rests against the hollow heel portion 74 of the valve 40. As pointed out, this opens the passage 76 from the seat 66 of the valve 40 and enables air to enter the vertical passage 78.

The counterpart valve 42 is closed by pressure in the inside space 80, thus urging the nose portion 68 toward the seat 82, closing the valve and, in effect, the passage 62. The MLT valve 56, is switched, in this example, to pass pressure from the compressor (not shown) through the small port 84 into the interior space 80. At the same time, pressure in the port appearing at 84 is also transmitted via passage 86 to the interior space 88 in the purge air valve 46. The positive pressure acts on the movable valve body 91 and the piston 90 which is attached by threaded shaft 92 to the valve head 94, thus moving the valve head 94 and the sealing rubber 97 off the fixed valve seat 99.

This opens valve 46 and permits the wet air to pass through the passage 96, the space along the threaded shaft 92 and to the outside air 100. When conditions in the interior of the valves 42, 46 are reversed, in other words, when the MLT valve pressurizes the other port 102, the interior space 104 in the valve 40, the passage 105 and the inner space 106 in the valve 44 are all pressurized.

Figure 3:
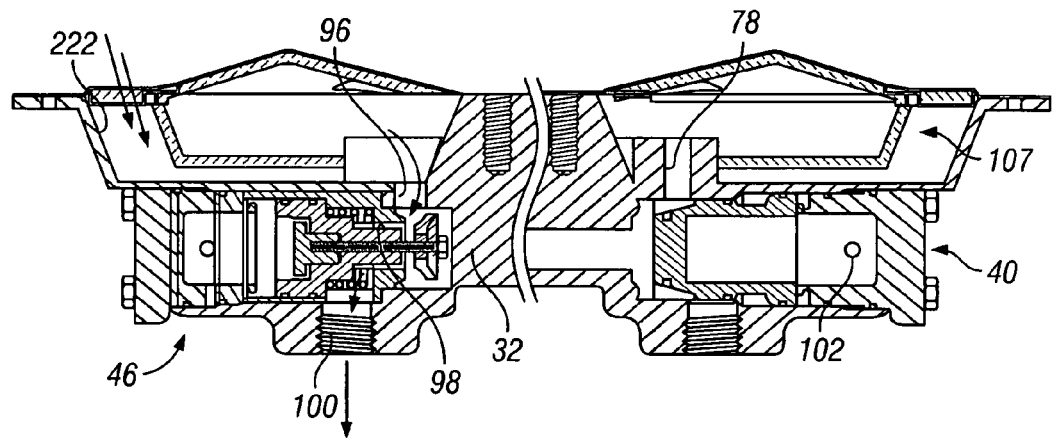
FIG. 3 is a vertical sectional view of the valve body shown in FIG. 2, showing one check valve and one purge valve and showing the dish and both air-oil separators of the invention.

FIG. 3 is another view showing the valve 46 in the open position and the valve 40 also in the open position. The inlet passages 84, 102 are alternatively for air pressure coming from the MLT valve and entering by way of either of the fittings 107, 108. (FIG. 1) When the valve 42 is closed, i.e. the body 69 engages seat 82, the passage 62 is blocked, and the air then flows past the seat 66 of the valve 40 into the vertical passage 78.

Referring now to FIGS. 3–6, there is shown just above the level of the valves 40, 42, etc. a pair of dished regions 107, 222, containing an important part of the invention, namely, the air-oil separator units 34, 36. For one such separator generally designated 36, and contained in use within the dished region 107, there is shown a flange plate 108 having a number of fastener openings 110 and a screen retainer 112, plus a plurality of tabs 114 which are welded to an imperforate center piece, preferably in the form of a dome element 116. This retainer 112 contains a number of openings 117, each containing a top screen 118, and each screen 118 covers a blanket 120 of a non-woven aramid filter material.

Figure 5:
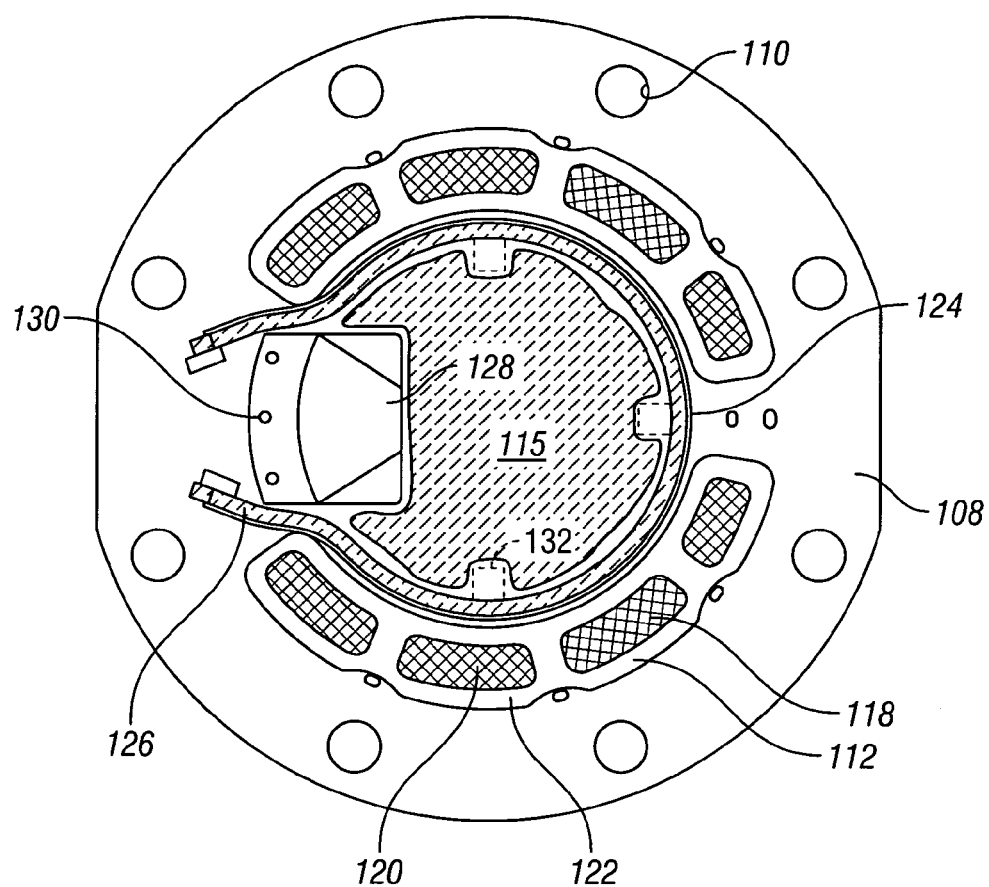
FIG. 5 is a bottom plan view of one of the separators of the invention.

Referring particularly to FIG. 5, which is a bottom view of the separator 36, there is shown an elongated, shallow pocket 122, as well as a bottom screen 118 and the blanket of aramid fiber material 120 therein. From this view, it can be seen that there is also a generally vertically extending outer metal fence 124, and an adjacent margin 126 filled with more of the aramid fiber material 120, which is attached with an adhesive to the fence 124 and the bottom surface 115 of the dome 116. Importantly, there is also a deflector panel 128, which is affixed by plural spot welding locations 130 to the flange plate 108.

Figure 6:
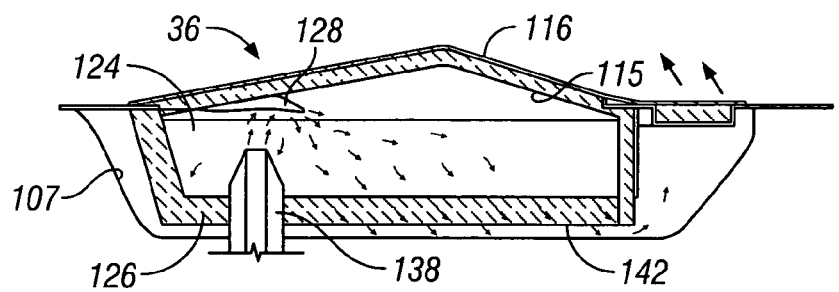
FIG. 6 is a vertical sectional view of a portion of the dish-like housing and the separator unit disposed therein.

As can be seen in FIG. 6, the air-oil separator 36 is positioned over the dished region 107 and the separator cooperates with the vertical passage 78 directed toward the deflector plate 128. The aramid fiber 120 is shown in FIG.

6 to cover the lower surface 115 of the dome 116 and to have a margin 126 extending just beneath the outer fence 124. The deflector plate 128 is for meeting the upwardly directed flow of air through the passage defined by tube 138 and causing it to reverse directions and swirl about in the cavity 107, ultimately passing beneath the bottom edge of the aramid material 120, which is just spaced from the bottom of the dish 107. The dish 107 is completely closed off by the air-oil separator, forcing all of the incoming air to pass through the openings 117 covered by the screens and the aramid fiber areas 120.

The fibers used in the openings 117 and on the sides 126 as well as covering the dome 116 are preferably aramid fibers. This material adsorbs the oil and water in the incoming air as well as filtering out particulate matter. Since the oil and water are adsorbed on the surface of the fibers, the fibers are susceptible to having the moisture and the oil stripped from them when the air flow is reversed. Thus, the aramid or like surface active fiber is responsible for a very extended service life of the blanket, typically ranging from 6 months to several years.

Figure 7:
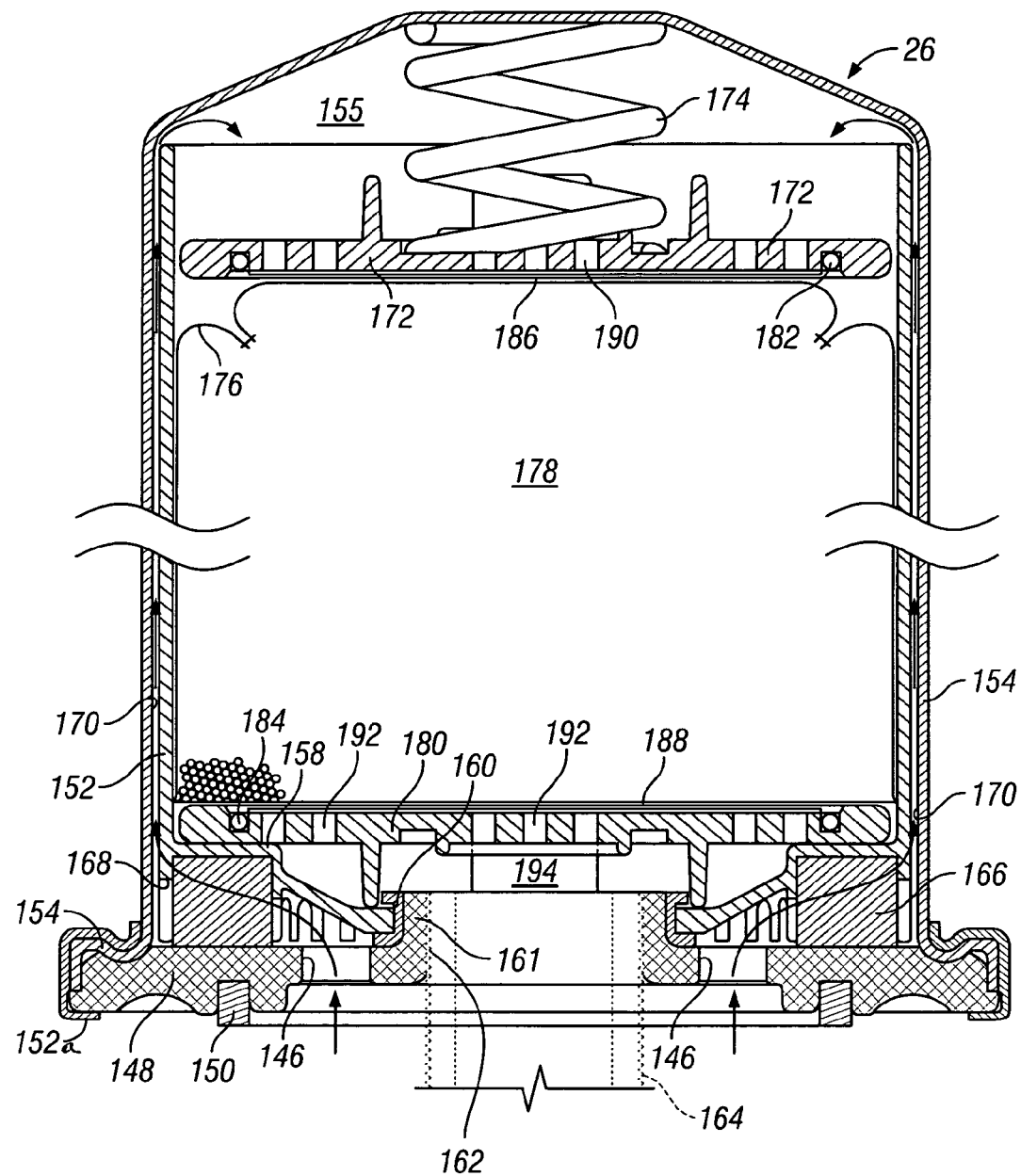
FIG. 7 is a vertical sectional view, with portions broken away, of one of the canisters of the invention, showing the attaching nipple in phantom.

Referring again to FIGS. 1 and 7, disposed atop the air-oil separator 34, 36 are a pair of canister mounts 28, 30 each having a nipple 164 and a plurality of inlet/outlet openings 144, therein. There are also a plurality of matching openings 146 in the bottom Plate 148 of each of the canister units 24, 26. Since these units 24, 26 are identical, only one unit 26 will be described in detail. The bottom plate 148 has a sealing ring or adapter 150 spaced inwardly from its outer curl 152a, which holds down the outer portion 154 of the canister 26. The inner canister 152 includes a flange 158 extending radially inwardly and terminating at a bight portion of a plate gasket 160. This gasket 160 in turn is pressed over the upwardly directed flange portion 161 of the plate 148. There are threads 162 which cooperate with a nipple 164 (FIG. 1) extending upwardly from the canister mount 30. The nipple 164 is also shown in phantom in FIG. 7.

Referring again to the canister 26, the space just above the passage 146 flares out and includes a filter element 166 terminating just short of the lower edge 168 of the inner canister 152, and communicating with the space 170 between the inner and outer canisters 152, 154.

At the upper end of the canister 26 is a strainer plate 172 held down by a spring 174. The bag 176 of desiccant 178 is held between the upper strainer plate 172 and the lower strainer plate 180. O-rings 182, 184 hold the cover units 186, 188 in place. The strainer plates have openings 190, 192 therein and these lead to the threaded interior portion 162 of the screw-on canister 26.

Figure 8:
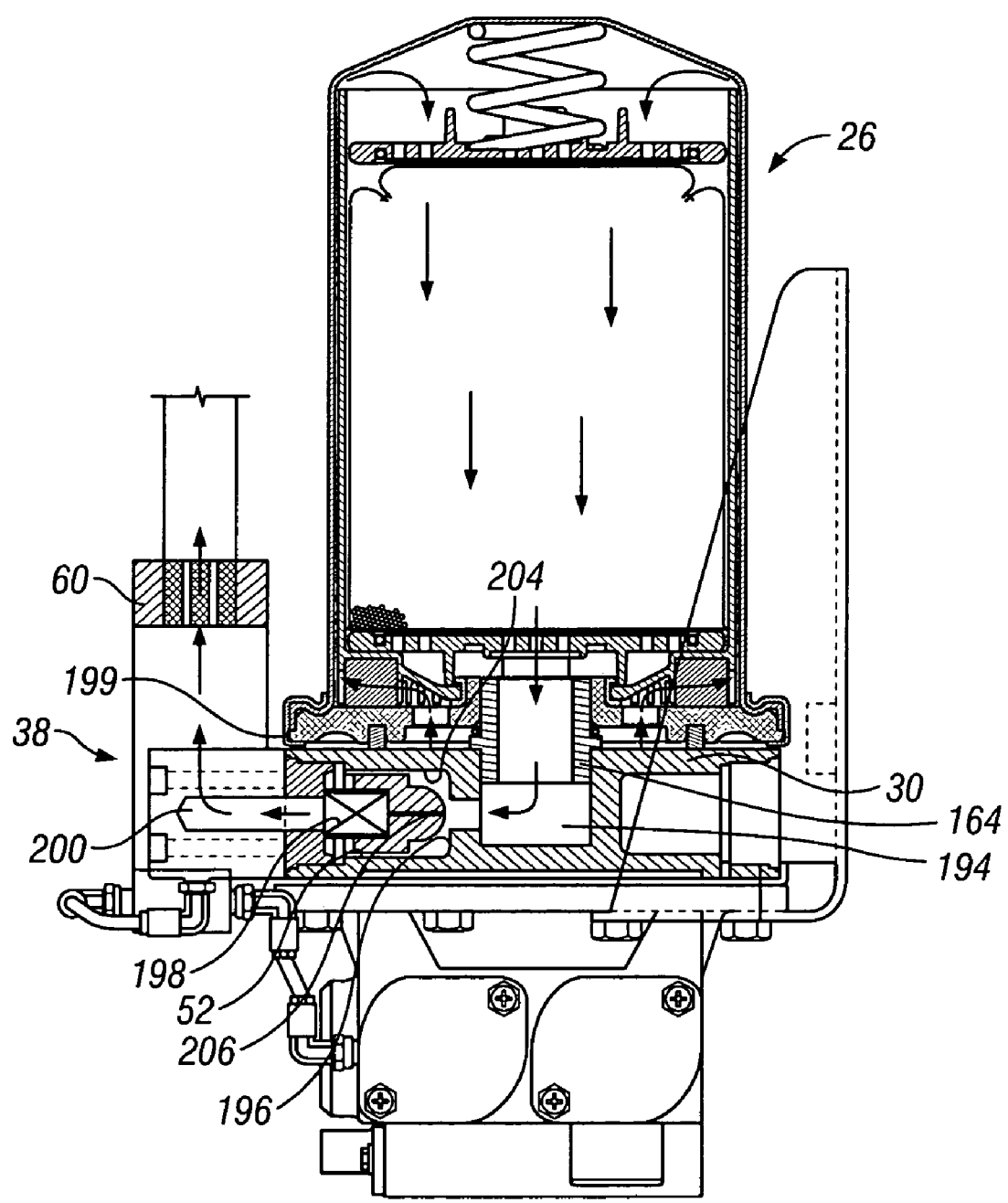
FIG. 8 is a vertical sectional view of one of the canisters showing one of the regeneration valves of the invention having a bleed passage therein in place within the manifold.

Referring now to FIG. 8, it is shown that the nipple 164 attaches the screw on canister 26 to the canister mount 30. From here, the central passage 194 leads into a reduced diameter seat 196 for the valve body 52. A spring 198 biases the valve closed to the passage 200 in the interior of the manifold 38, such passage 200 communicating with a check valve 54 (FIG. 1) leading to the fitting 60 and ultimately to the compressed air storage tank (not shown). The valve body 52 contains several flutes 202 (FIG. 1) to maintain its concentricity with the passage 204. The valve body 52 also includes a small central bleed passage 206 which is open whether or not the valve 52 is closed.

Figure 9:
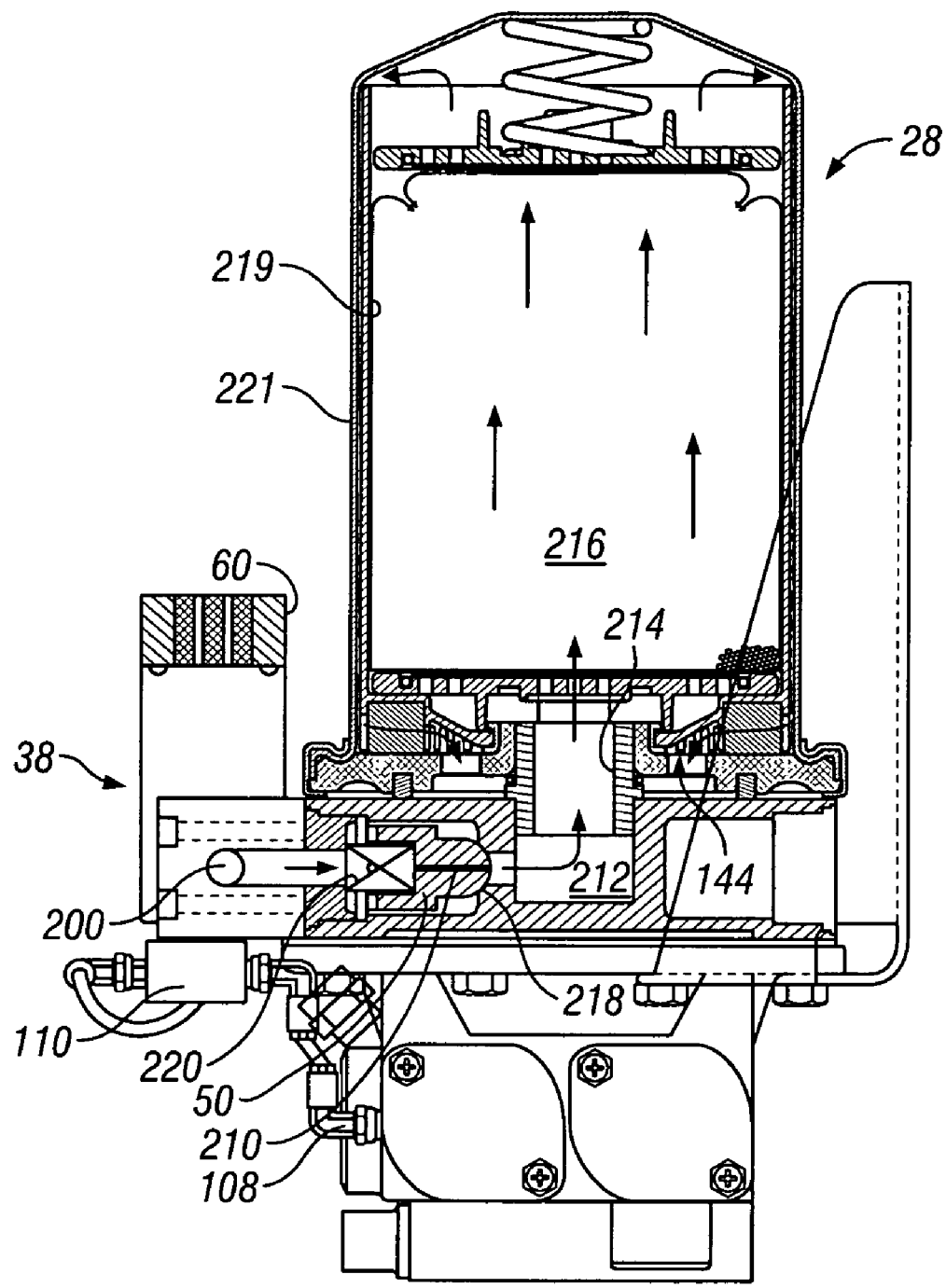
FIG. 9 is a view similar to FIG. 8, showing a regeneration valve in place and showing a canister being regenerated with air passing through the bleed opening in a direction opposite to that shown in FIG. 8.

FIG. 9 shows a mirror image of canister 26. This drawing shows that everything is the same as in FIG. 8, except that much smaller air flow is going in a reverse direction in respect to that shown in FIG. 8. This is because the valve body 50 is on the seat 218, and air can only pass through the very small central passage 210 in the valve body 50, through the passage 212, the nipple 214, the desiccant 216, etc. The air also passes between inner and outer canisters 219, 221 and through the passages 144 in the canister mount 28. Ultimately, the air flow goes downwardly into to the dished region 222 (FIG. 3) in the valve body 32, passing in a reverse direction through the air-oil separator, thus stripping the adsorbed oil and moisture from the separator 34.

FIG. 3 is a larger scale view showing that the moisture-laden air flowing in a reverse direction collects in the dished region 222, from which it may pass through port 96, and through the valve 46 to the discharge port 100.

Referring now to the operation of the apparatus 18 as a whole, it will be assumed that there is pressure from the compressor or other source that is entering the lower valve body 32 through the opening 58. Further, assume that the position of the MLT valve is such that, initially, it will pressurize the port 84 instead of the port 102. With pressure being supplied to the port 84, it enters the space 80 in the check valve and pushes the valve body 69 against the seat 82. The pressure will also be seen in port 86, which connects with the interior 88 of the purge valve 46. This pushes the piston 90 and the movable part of the body 91 to the right as shown in FIG. 2. This also opens the passage 98 in the valve 46 (FIG. 3), opening it to a discharge of moisture and oil-laden air. Because the MLT vakie valve is furnishing air to port 84, it is not furnishing any air pressure to port 102. Therefore, the valve body 70 is pushed off its seat 66, by incoming air in passage 64, thus opening passage 72 and in particular, the vertical passage 78, to air flow from the compressor. The space 104 is of a reduced length because the chamber region 104 is not pressurized. Likewise, the pressure in the passage 105 in the interior 106 of the purge valve is at a minimum. This allows the body 93 of the valve to go to the right, carrying with it the piston 95 and valve head 97.

Referring now to FIG. 3, it is shown that the vertical passage 78 directs the air into the dished region 107. This air, which contains some oil and water vapor, is traveling rapidly, impinges upon the deflector plate 128, which scatters the air about. This turbulence separates most of the oil from the air, and it is adsorbed on the filter material 120. The air then, having reversed its flow, passes beneath the fence 124 and again reverses flow and has contact with the lower surface 115 of the dome 116 and the margin 126 containing the filter material 120. The air passes in the space 142 beneath the filter material and is then directed upwardly through the openings 117 covered by the screen 118 and enclosing the fibers 120. Finally, passage through the openings 117 adsorbs the remaining oil and water vapor.

From here, the air is directed through ports 146 in the canister mount 30, which is kept air tight by the provision of the gasket 150. Then, the air passes through the annular filter 166, and into the space 170 between the outer canister 154 and the inner canister 156. After traveling through the space 170, the incoming air is led to the space 155 inside the canister 26, where it passes through various openings 190, through the strainer cover 186 and downwardly into the desiccant 178 retained by the bag 176.

This process exposes the desiccant to the incoming air and effectively dries it, reducing its relatively humidity to almost zero. From here, the air passes through another strainer cover 188 and through the openings 192 in the lower strainer plate and ultimately to the outlet 194, which in position of use lies within the nipple 164.

The space 194 communicates with the seat 196 for the valve body 52. The large volume of high pressure air appearing in the passage 194 overcomes the force from spring 198 and unseats this valve body. This air under pressure is taken by the manifold 38 through the passage 200 which leads to the supply for the tank through the fitting 60.

At the same time, a very small but measured portion of the air appearing in the manifold 38 is directed to the small passage 210 located centrally in the body of the valve 50. The body of this valve 50 rests on the seat 218, and consequently, the valve 50 will not admit more air than can pass through the passage 210. A spring 220 maintains this bias. The air, now flowing in passage 212 is directed upwardly in the center of the canister 28, passing through the desiccant 216 and out between the walls 219, 221 of the canister 28. Then, the air flows through ports 144, to the dished region 222 and backwardly through the air-oil separator 34 and lying just above the purge valve 46.

A cycle has been discussed with respect to the right hand canister 26 which is drying the air, while the canister 24 is having its moisture removed from the desiccant by a portion of the dry air furnished to it and going through the small passage 210 in the valve 50. After a suitable interval, the MLT valve simply reverses the flow of air into the port 84, now furnishing it to the port 102. From here, the inlet passage 62 is closed and the passage 64 is opened, sending air through the vertical passage 79.

Figure 4:
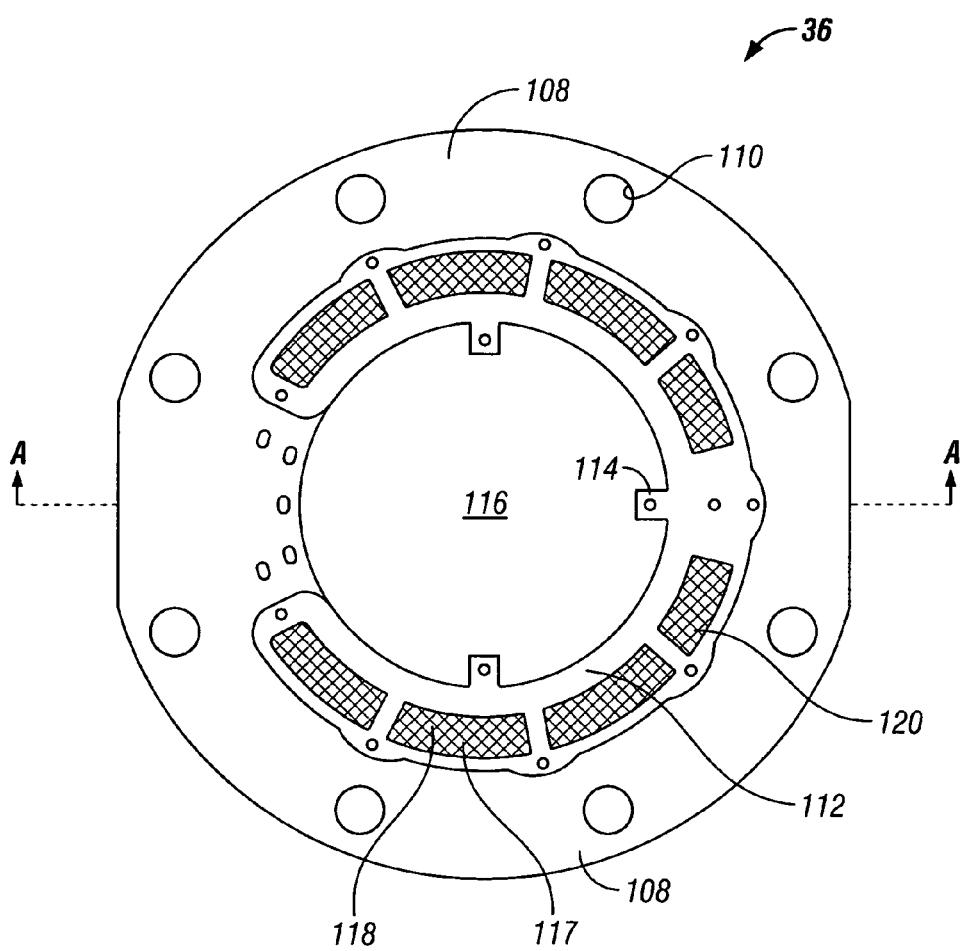
FIG. 4 is a top plan view of one of the air-oil separators of the invention.

An oil-air separator identical that shown in FIGS. 4–6 is located in the dished region 222 and it performs the same function, while one of the purge valves 44, 46 is opened, allowing air to escape and pass through the outlet ports 100, 107. The purge valve 46 having been opened as previously explained, permits the moisture-laden purge air to pass the valve 98 into the passage 100, where it vents to the atmosphere.

When the MLT valve is biased oppositely, the check valve is then closed by reason of the volume 104 being pressurized, and the valve 44 being opened by reason of pressure in the chamber 106. As pointed out, a passage 105 between the two valves 40, 44 pressurizes them both, or depressurizes both.

Referring now to the materials from which the air dryer unit is preferably made, the canisters are preferably made from a thin gauge but still substantial material such as 0.060 inches thick steel. The canister mounts are preferably made from a cast material such as a die cast aluminum. The air-oil separators including the flange material and the center plate or dome element 116 are all made from a stainless steel material. The filter medium is made from a surface active material such as an aramid fiber or like material. The aramid fiber material is in the form of a non-woven blanket and is permeable to air. There are openings 118 closed off by filter media and a stainless steel screen material. In other words, this flange plate 108 includes an elongated shallow pocket 122 having open bottom areas 117 in the stainless steel, with counterpart open areas in the cover 112 spot welded over them. These two sheets with the pockets enclose the screen and the aramid fiber material between them.

These air-oil separators are believed to be effective because of their configuration, which causes the air to undergo two reversals of direction, which is thought to be very helpful in causing the entrained oil to be separated from the air stream. In addition to this construction, there is of course the filtering effect obtained by directing the vertical flow through the horizontally placed filters lying inboard of the outer margins of the flange plate. Of course, the adsorption contributed by the fiber material is also very important, as is the ability to have oil and moisture stripped when air flow is reversed.

The lower valve body is made from cast aluminum, as is the manifold 38. The valves 44, 46 are made from a combination of aluminum and plastic materials. One feature of the invention which is important is the ready removability and interchangeability of these valves 44, 46. The valves are retained in place by screws as illustrated in FIGS. 1, 2, and 3. The cover plates 250 are aluminum and are held in place by fasteners 252. The plates are integrally formed with the non-movable half of the valve bodies. When it comes time to repair or replace these valves 40–46, or change the calibration of the valves 50, 52, this is readily accomplished by simply removing and replacing them. The valves 50, 52 are readily removable by removing the manifold and simply taking the valve cores out and replacing them with others. This may be done for purposes of making the bleed holes larger or smaller, depending on the volume of air flow with which the system operates. The nose or movable portions 69, 76 of the valves 40, 42 are made from brass, although other materials could be used. All the sleeve portions 99, 101 of the valves 40, 42, 46 are aluminum, and Viton® fluorocarbon rubber o-rings are used to seal the piston and movable portion of the valves 40, 42, 44, 46.

The MLT valve described above is illustrated in FIG. 1 and FIG. 9. It will be noted that a supply of pilot air enters the block 110 of the valve which contains two outlets 107, 108. A spool valve (not shown) in the center of the housing 110 may be pulled back and forth by a solenoid, supplying air to one or the other of the tubes and fittings 107, 108.

It will thus be seen that the present invention provides a novel air dryer system and air-oil separator having a number of advantages and characteristics including those pointed out above and others which are inherent in the invention. A preferred embodiment having been described, it is anticipated that modifications and changes will occur to those skilled in the art and that such modifications and changes may be made without departing from the spirit of the invention or the scope of the appended claims.

We claim:

1. An air dryer system including two substantially identical air dryer units, each including, in one mode, a first moist air inlet, a first desiccant for drying air, a first dry air outlet, and first means for supplying dry air to a storage facility, said system also including, in the same mode, a first bleed valve supplying a small portion of said dry air to regenerate a second desiccant, and a first moist air purge valve for dumping moisture collected during regeneration, said system being also operable in an opposite mode and having a second moist air inlet, a second desiccant, a second dry air outlet and second means for supplying air to a storage facility, and a second bleed valve supplying a small portion of said dry air to regenerate said first desiccant, and a second moist air purge valve, and located between said moist air inlets and said desiccants, a pair of air-oil separators including means defining a generally upwardly directed air supply, each air-oil separator assembly lying in a housing, said assemblies each having a deflector plate disposed opposite said air supply, an imperforate center section and a generally vertically extending fence at least partially surrounding said center section, air passage means lying outboard of said imperforate center section and containing a filter medium, said filter medium also being associated with at least one of said center section and said fence.

2. An air dryer system as defined in claim 1 wherein said desiccant is contained in a spin-on cartridge, said desiccant being contained within a bag located within said housing.

3. An air dryer system as defined in claim 1 wherein said air-oil separators each include a flange portion lying outboard of said air passage means, said flange portion also serving to removably secure said air-oil separator in place within said air dryer system.

4. An air dryer system as defined in claim 1 wherein said air passage means comprises a plurality of pockets, each of said pockets containing said filter medium and each of said pockets having a pair of screens therein enclosing said filter medium between them.

5. An air dryer system as defined in claim 1 wherein said imperforate center section is in the form of a plate having a shallow conical dome.

6. An air dryer system as defined in claim 1 wherein said filter medium comprises an aramid fiber material.

7. An air dryer system as defined in claim 6 wherein said aramid fiber material is formed into a nonwoven blanket.

8. An air dryer system as defined in claim 7 wherein said aramid fiber material covers both the inside of said fence and the inside surfaces of said center section, said blanket being secured to said center section and said fence by an adhesive material.

9. An air dryer system as defined in claim 1 which includes means permitting ready removal of said first and second moist air inlets.

10. An air dryer system as defined in claim 1 which includes means permitting ready removal and replacement of said first and second bleed valves.

11. An air-oil separator for use with a cartridge containing a finely subdivided desiccant, said air-oil separator being disposed in use between an air inlet valve and said cartridge, and means for directing air flow generally upwardly of said inlet valve, said air-oil separator including a flange plate for closing off a housing upstream of said air inlet valve, at least one opening in said flange plate permitting air flow therethrough, filter material disposed within said opening, an imperforate center section lying inboard of said at least one opening, a deflector beneath a portion of said center section, and a fence extending generally downwardly from said center section, said filter material also covering at least one of the lower surface of said center section and the inner surface of said fence, said air inlet directing air and entrained oil toward said deflector, and said air then passing beneath said fence and upwardly through said opening to said desiccant.

12. An air-oil separator as defined in claim 11 wherein said filter material is a surface active material tending to absorb oil on its surface from air containing oil and being charged under pressure to said desiccant, and to desorb said oil when air is flowing over said material from said desiccant.

13. An air-oil separator as defined in claim 11 wherein said filtering material is made from an aramid fiber material.

14. An air-oil separator as defined in claim 13 wherein said aramid fiber is in the form of a nonwoven fiber material.

15. An air-oil separator as defined in claim 11 wherein said filter material is adhesively secured to both said fence and said center section.

16. An air-oil separator as defined in claim 11 wherein said at least one opening comprises plural openings.

17. An air-oil separator as defined in claim 11 wherein said at least one opening includes upper and lower screens and trappings said filter material between them.

18. An air-oil separator as defined in claim 11 wherein said at least one opening comprises a plurality of openings, said openings being comprised of a lower pocket, a lower screen, a charge of filter material, and upper screen and a top pocket cover.

19. An air-oil separator as defined in claim 11 wherein said imperforate center section includes a pointed, shallow dome section.

* * * * *